US009093628B2

(12) United States Patent
Yabuki et al.

(10) Patent No.: US 9,093,628 B2
(45) Date of Patent: Jul. 28, 2015

(54) LIQUID CRYSTAL DISPLAY DEVICE

(71) Applicant: Panasonic Liquid Crystal Display Co., Ltd., Himeji-shi, Hyogo (JP)

(72) Inventors: Hiroyuki Yabuki, Osaka (JP);
Tomohiro Nakayama, Osaka (JP);
Yoshihiko Uchida, Osaka (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 14/200,033

(22) Filed: Mar. 7, 2014

(65) Prior Publication Data
US 2015/0171295 A1 Jun. 18, 2015

(30) Foreign Application Priority Data
Dec. 18, 2013 (JP) .................................. 2013-260885

(51) Int. Cl.
*H01L 29/10* (2006.01)
*H01L 33/62* (2010.01)

(52) U.S. Cl.
CPC ...................................... *H01L 33/62* (2013.01)

(58) Field of Classification Search
CPC ... H01L 27/124; H01L 27/1225; H01L 24/01;
H01L 27/1218; H01L 27/1259
See application file for complete search history.

(56) References Cited

U.S. PATENT DOCUMENTS 5,446,568 A 8/1995 Nakazawa et al.
2014/0347590 A1* 11/2014 Fujita et al. ..................... 349/43

FOREIGN PATENT DOCUMENTS

JP 03-64735 A 3/1991
JP 2001-117118 A 4/2001

* cited by examiner

*Primary Examiner* — Tony Tran
(74) *Attorney, Agent, or Firm* — Hubbs, Enatsky & Inoue PLLC

(57) ABSTRACT

Provided is a liquid crystal display device including a TFT substrate including a pixel electrode and a common electrode. A GAL layer includes gate signal lines, a CMT layer includes common signal lines and a common signal bus line, and an SDL layer includes data signal lines. At least one of the GAL layer and the SDL layer includes a common potential bus line. Further, the TFT substrate includes an interlayer connecting portion for connecting the common signal bus line and the common potential bus line to each other.

15 Claims, 9 Drawing Sheets

LIQUID CRYSTAL DISPLAY DEVICE

CROSS-REFERENCE TO RELATED APPLICATION

The present application claims priority from Japanese application JP 2013-260885 filed on Dec. 18, 2013, the content of which is hereby incorporated by reference into this application.

TECHNICAL FIELD

The present application relates to a liquid crystal display device.

BACKGROUND

A liquid crystal display device includes a pixel electrode whose potential is controlled by a thin film transistor, a common electrode whose potential is controlled by a common signal, and a liquid crystal layer to which an electric field generated between the pixel electrode and the common electrode is applied. In the liquid crystal display device, the potential of the pixel electrode is controlled to change the electric field to be applied to the liquid crystal layer. In this manner, transmittance/non-transmittance of light from a backlight unit through the liquid crystal layer is controlled to display an image on a display surface of the liquid crystal display device.

As the screen size increases and the resolution of a displayed image becomes higher, the value of a common potential to be supplied to each of the common signal lines further increases, and the influence of resistance of each of the common signal lines increases.

Hence, a liquid crystal display device in which influence of resistance with respect to a common potential to be supplied to common signal lines is reduced is desired.

SUMMARY

In one general aspect, the instant application describes a liquid crystal display device, including a TFT substrate including: a plurality of pixel electrodes having potentials controlled by a plurality of transistors; and a common electrode having a common potential supplied. The TFT substrate includes an A wiring layer; a B wiring layer, which is formed above the A wiring layer through an intermediate layer of a first insulating layer; and a C wiring layer, which is formed above the B wiring layer through an intermediate layer of a second insulating layer. A first wiring layer of the A, B, or C wiring layers includes a plurality of gate signal lines for supplying a gate signal to the plurality of transistors. A second wiring layer different from the first wiring layer including the plurality of gate signal lines, includes a plurality of common signal lines for supplying the common potential to the common electrode and a common signal bus line for connecting together ends of at least two of the plurality of common signal lines, the common signal bus line being made of a conductor. A third wiring layer different from the first wiring layer including the plurality of gate signal lines and the second wiring layer including the plurality of common signal lines and the common signal bus line, includes a plurality of data signal lines for supplying a data signal to the plurality of transistors. At least one of the first wiring layer including the plurality of gate signal lines and the third wiring layer including the plurality of data signal lines, includes a common potential bus line for supplying the common potential to the plurality of common signal lines. The TFT substrate further includes an interlayer connecting portion for connecting the common signal bus line and the common potential bus line to each other. The interlayer connects portion being made of a conductor.

The above general aspect may include one or more of the following features. For example, the at least two of the plurality of common signal lines may be formed so as to protrude and extend from the common signal bus line.

The TFT substrate may have a surface including a display region in which the plurality of pixel electrodes are formed and a non-display region that surrounds the display region. The common signal bus line and the common potential bus line may be formed in a region corresponding to the non-display region.

The common signal bus line and the common potential bus line may at least partially overlap with each other.

The common signal bus line may connect together the ends of all of the plurality of common signal lines.

The A wiring layer may include the plurality of gate signal lines, the B wiring layer may include the plurality of data signal lines and the common potential bus line, and the C wiring layer may include the plurality of common signal lines and the common signal bus line.

The A wiring layer may include the plurality of gate signal lines and the common potential bus line, the B wiring layer may include the plurality of data signal lines, and the C wiring layer may include the plurality of common signal lines and the common signal bus line.

The A wiring layer may include the plurality of gate signal lines, the B wiring layer may include the plurality of data signal lines, the C wiring layer may include the plurality of common signal lines and the common signal bus line. The common potential bus line may include an A wiring layer common potential bus line formed in the A wiring layer and a B wiring layer common potential bus line formed in the B wiring layer.

The interlayer connecting portion may include: a connecting portion having a planar shape, a first pass-through portion, and a second pass-through portion. The connecting portion may be formed above the C wiring layer through an intermediate layer of a third insulating layer. The first pass-through portion may pass through the third insulation layer to connect the connecting portion and the common signal bus line to each other. The second pass-through portion may pass through the third insulating layer, the C wiring layer, and the second insulating layer to connect the connecting portion and the common potential bus line to each other.

The interlayer connecting portion may include a first interlayer connecting portion, which includes a first connecting portion, a first pass-through portion, and a second pass-through portion and a second interlayer connecting portion, which includes a second connecting portion, a third pass-through portion and a fourth pass-through portion. The first interlayer connecting portion may include a first connecting portion which may have a planar shape, which is formed above the C wiring layer through an intermediate layer of a third insulating layer. The first pass-through portion may pass through the third insulating layer to connect the first connecting portion and the common signal bus line to each other. The second pass-through portion may pass through the third insulating layer, the C wiring layer, and the second insulating layer to connect the first connecting portion and the B wiring layer common potential bus line to each other. The second connecting portion may have a planar shape which is formed above the C wiring layer through an intermediate layer of the third insulating layer. The third pass-through portion may pass through the third insulating layer to connect the second connecting portion and the common signal bus line to each other. The fourth pass-through portion may pass through the third insulating layer, the C wiring layer, the second insulating layer, the B wiring layer, and the first insulating layer to connect the second connecting portion and the A wiring layer common potential bus line to each other.

Further, according to one embodiment of the present invention, the first pass-through portion of each of a plurality of the interlayer connecting portions is connected to a part of the common signal bus line, which is adjacent to one of the ends of the plurality of common signal lines.

The above general aspect may include one or more of the following features. For example, the common potential bus line and the common signal bus line may be connected to a common potential supply terminal of the TFT substrate, from which the common potential is supplied.

The interlayer connecting portion may be made of a transparent electrode material.

The interlayer connecting portion may be provided for each of the ends of the plurality of common signal lines.

The C wiring layer may include a layer made of an organic material.

The common signal bus line and the common potential bus line may be formed in a short-side direction of the TFT substrate.

The common signal bus line may be formed in a long-side direction of the TFT substrate.

The common potential supply terminal may be arranged in a long-side direction of the TFT substrate.

The general and specific aspects may be implemented using a system, a method, or a computer program, or any combination of systems, methods, and computer programs. Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components and/or circuitry have been described at a relatively high-level, without detail, in order to avoid unnecessarily obscuring aspects of the present teachings.

The various systems and methods disclosed herein relate to a liquid crystal display device and a method of manufacturing a liquid crystal display device.

Figure 1:
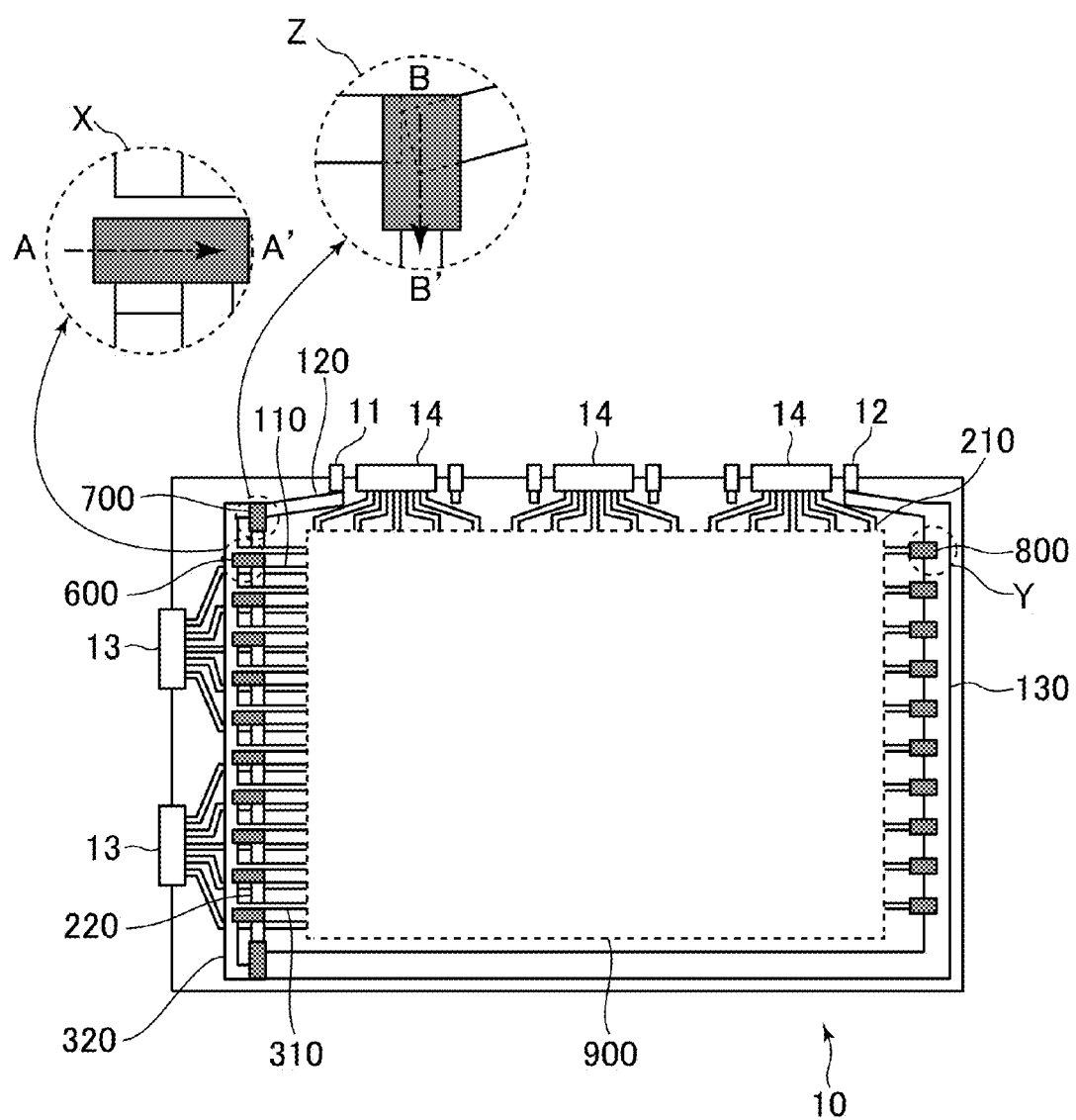
FIG. 1 illustrates an exemplary configuration of an outer peripheral part of a TFT substrate of a liquid crystal display device of the present application.
Figure 2:
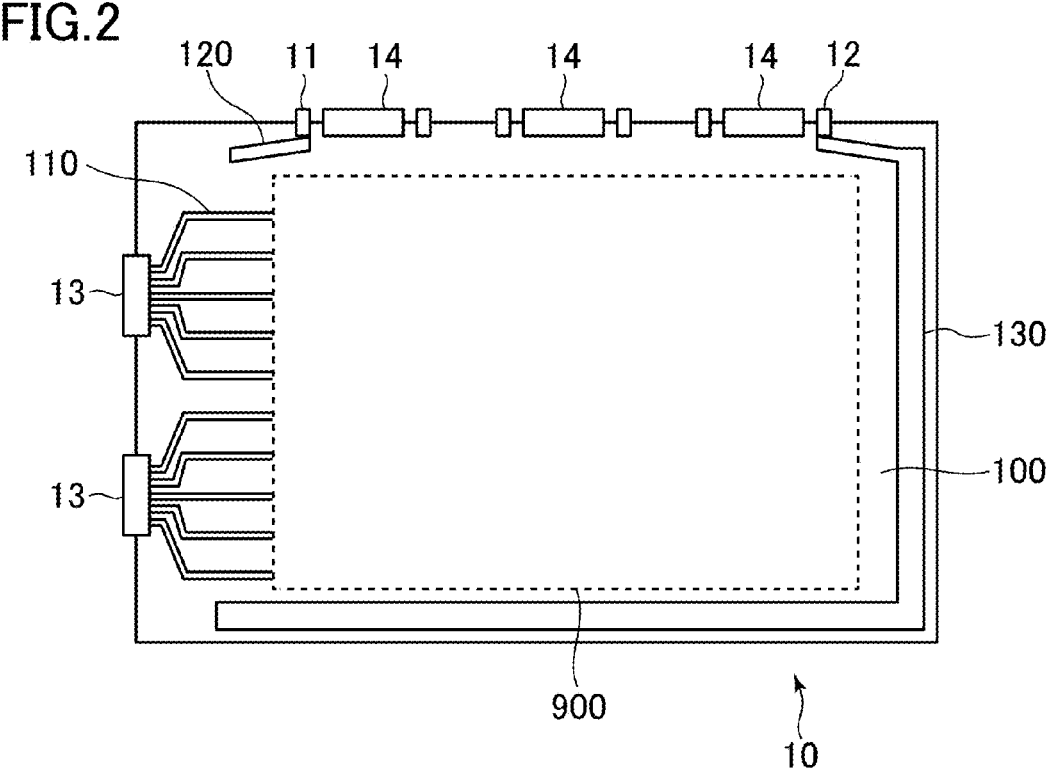
FIG. 2 illustrates an exemplary configuration of an outer peripheral part of a GAL layer forming the TFT substrate of the liquid crystal display device shown in FIG. 1.
Figure 3:
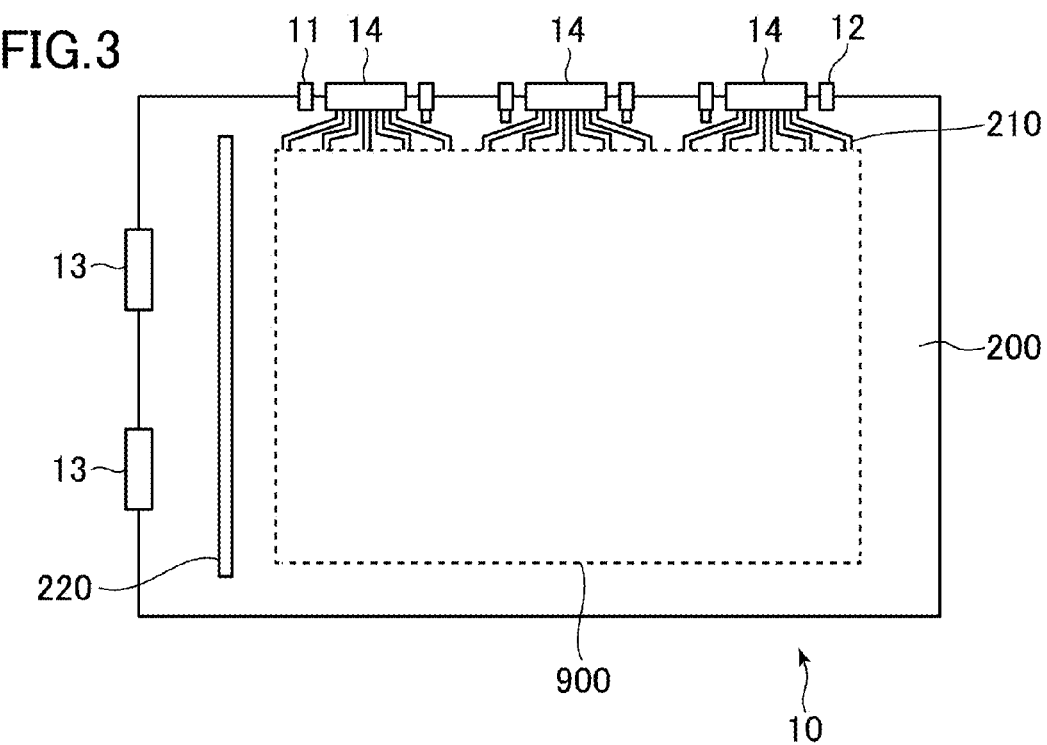
FIG. 3 illustrates an exemplary configuration of an outer peripheral part of an SDL layer forming the TFT substrate of the liquid crystal display device shown in FIG. 1.
Figure 4:
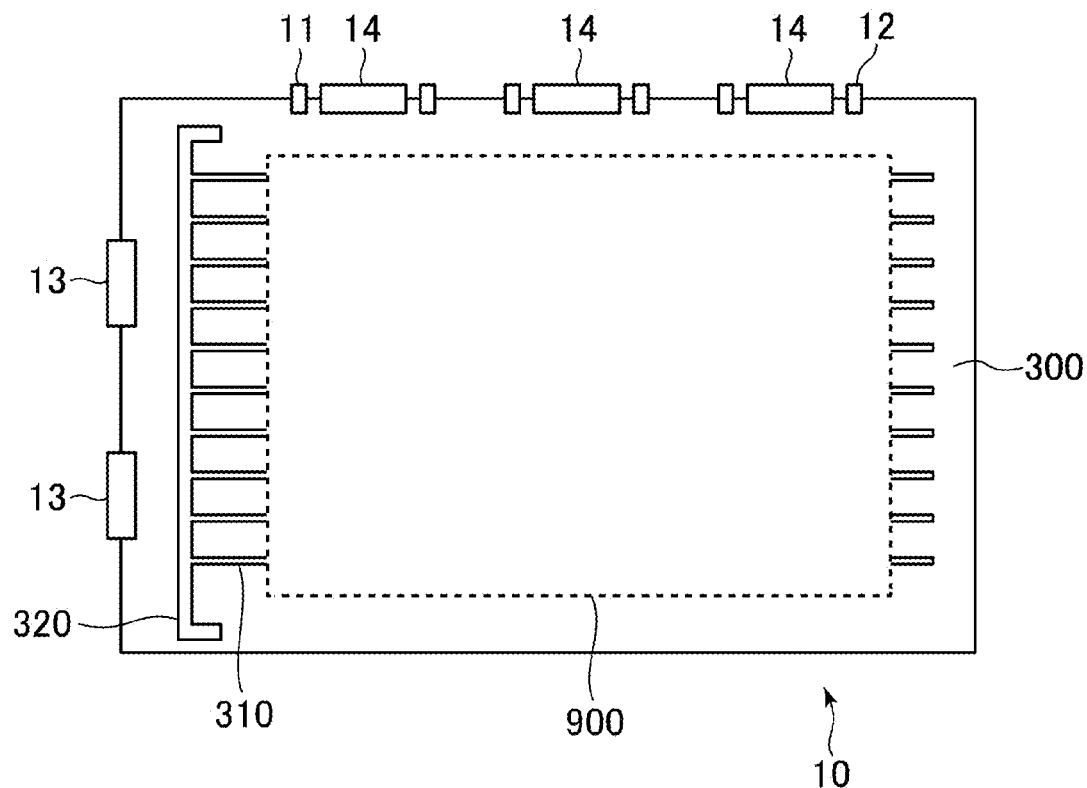
FIG. 4 illustrates an exemplary configuration of an outer peripheral part of a CMT layer forming the TFT substrate of the liquid crystal display device shown in FIG. 1.

FIG. 1 illustrates an exemplary configuration of a liquid crystal display device and an outer peripheral part of a TFT substrate 10 of a liquid crystal display device of the present application. FIG. 2 illustrates an exemplary configuration of an outer peripheral part of a GAL layer 100 forming the TFT substrate 10 of the liquid crystal display device shown FIG. 1. FIG. 3 illustrates an exemplary configuration of an outer peripheral part of an SDL layer 200 forming the TFT substrate of the liquid crystal display device shown FIG. 1. FIG. 4 illustrates an exemplary configuration of an outer peripheral part of a CMT layer 300 forming the TFT substrate of the liquid crystal display shown FIG. 1. In one implementation, a first wiring layer corresponds to the GAL layer, a second wiring layer corresponds to the SDL layer, and a third wiring layer corresponds to the CMT layer. Further, in this embodiment, the SDL layer (second wiring layer) 200 is formed above the GAL layer (first wiring layer) 100 via a first insulating layer 400, and the CMT layer (third wiring layer) 300 is formed above the SDL layer (second wiring layer) 200 via a second insulating layer 500.

Figure 5:
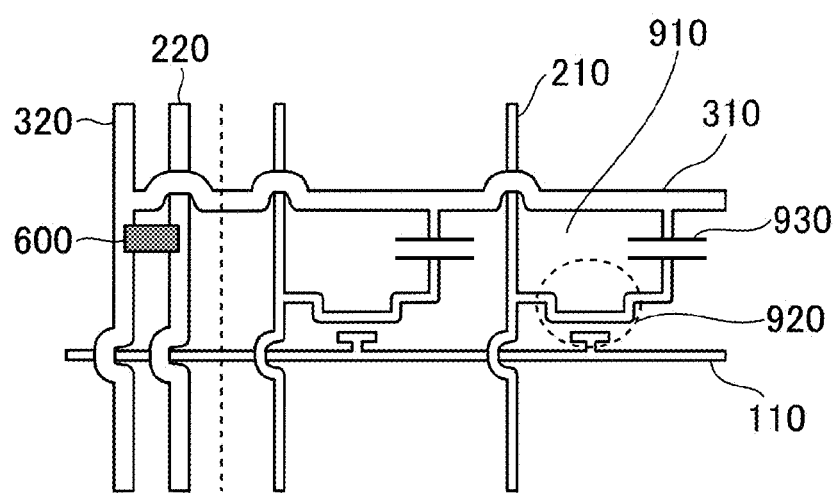
FIG. 5 illustrates an exemplary configuration of a pixel region of the TFT substrate of the liquid crystal display device shown in FIG. 1.

The TFT substrate 10 includes a plurality of gate signal lines 110, a common signal input line 120, and a GAL layer common potential bus line 130, which are formed in the GAL layer 100, a plurality of data signal lines 210 and an SDL layer common potential bus line 220, which are formed in the SDL layer 200, and a plurality of common signal lines 310 and a common signal bus line 320 connecting together ends of the common signal lines 310, which are formed in the CMT layer 300. In the case of this embodiment, all of the common signal lines 310 are formed so as to protrude and extend from the common signal bus line 320. That is, the common signal bus line 320 connects together the ends of all of the common signal lines 310. In a display region 900 represented by broken lines in FIGS. 1 to 4, the plurality of gate signal lines 110 and the plurality of data signal lines 210 form a plurality of pixel regions 910 in matrix. On the other hand, the pixel region 910 is not formed in a region surrounding the display region 900, and an image is not displayed in the region. In the following, this region is referred to as "non-display region". FIG. 5 illustrates an exemplary configuration of the pixel region 910 of the TFT substrate 10 of the liquid crystal display device of this application. The pixel region 910 includes a thin film transistor 920 that is driven by a gate signal supplied from the gate signal line 110 and a data signal supplied from the data signal line 210, which are adjacent to the corresponding pixel region 910. Further, the common signal line 310 supplies a common potential to a common electrode 930.

In this case, the gate signal for driving the thin film transistor 920 is input from a gate signal supply terminal 13 and is transmitted through the gate signal line 110 of the GAL layer 100. The data signal for driving the thin film transistor 920 is input from a data signal supply terminal 14 of the TFT substrate 10 and is transmitted through the data signal line 210 of the SDL layer 200.

The common signal supplied from the common signal line 310 to the common electrode 930 is input from each of common potential supply terminals 11 and 12 of the TFT substrate 10.

The common signal input from the common potential supply terminal 11 of the TFT substrate 10 is transmitted via the common signal input line 120 formed in the GAL layer 100 through the SDL layer common potential bus line 220 formed in the SDL layer 200 and through the common signal bus line 320 formed in the CMT layer 300. The SDL layer common potential bus line 220 and the common signal bus line 320 of the CMT layer 300 are connected to each other via an interlayer connecting portion 600. Further, the common signal bus line 320 and the common signal lines 310 are formed in a connected manner in the CMT layer 300, and hence the common signal is input to the common signal lines 310.

Figure 6:
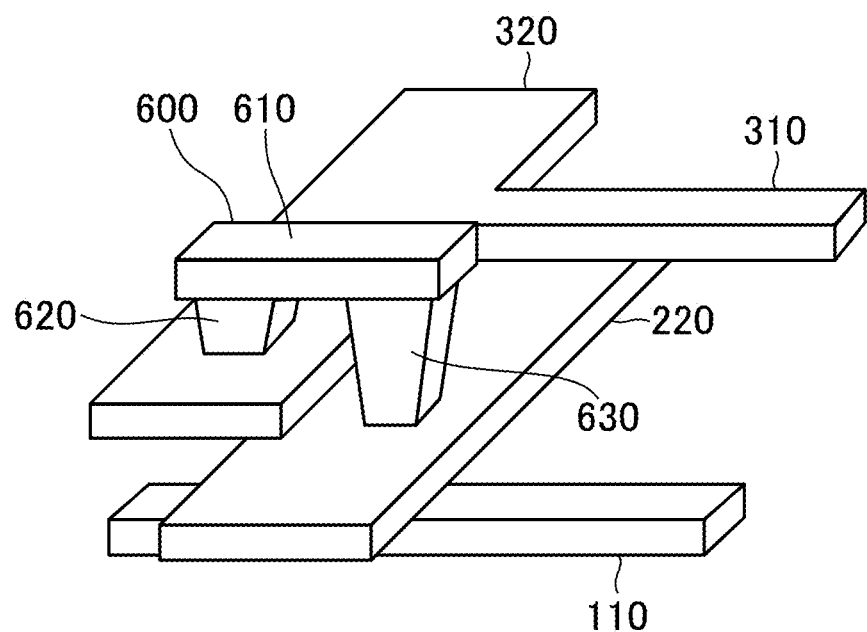
FIG. 6 illustrates an exemplary connection structure of signal lines in an X part of the ITT substrate of the liquid crystal display device shown in FIG. 1.

FIG. 6 illustrates an exemplary connection structure of signal lines in an X part of the TFT substrate 10 of the liquid crystal display device of this application. As shown in FIG. 6, the SDL layer common potential bus line 220 formed in the SDL layer 200 and the common signal bus line 320 formed in the CMT layer 300 are connected to each other by the interlayer connecting portion 600 including a planar connecting portion 610, a first pass-through portion 620, and a second pass-through portion 630. The connecting portion 610 is formed above the CMT layer 300 through intermediation of a third insulating layer 530 (not shown). The first pass-through portion 620 passes through the third insulating layer 530 to connect the connecting portion 610 and the common signal bus line 320 to each other. The second pass-through portion 630 passes through the third insulating layer 530, the CMT layer 300, and the second insulating layer 500 (not shown) to connect the connecting portion 610 and the SDL layer common potential bus line 220 to each other. As shown in FIGS. 1 and 6, the interlayer connecting portion 600 is provided at a part of the common signal bus line 320, which is adjacent to the end of the common signal line 310. The interlayer connecting portions 600 are provided as many as the common signal lines 310.

On the other hand, the common signal input from the common potential supply terminal 12 of the TFT substrate 10 is transmitted through the GAL layer common potential bus line 130 formed in the GAL layer 100. The GAL layer common potential bus line 130 and the common signal lines 310 of the CMT layer 300 are connected to each other via second interlayer connecting portions 800.

Figure 7:
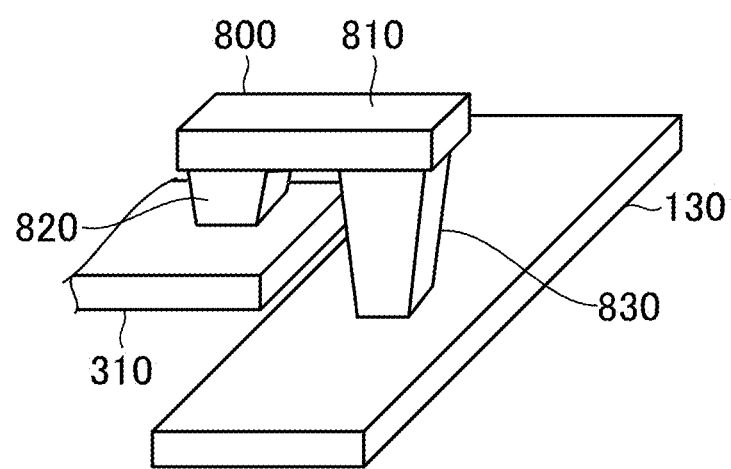
FIG. 7 illustrates an exemplary connection structure of the signal lines in a Y part of the TFT substrate of the liquid crystal display device shown in FIG. 1.

FIG. 7 illustrates an exemplary connection structure of signal lines in a Y part of the TFT substrate 10 of the liquid crystal display device of this application. As shown in FIG. 7, the GAL layer common potential bus line 130 formed in the GAL layer 100 and the common signal line 310 formed in the CMT layer 300 are connected to each other by the second interlayer connecting portion 800 including a planar connecting portion 810, a first pass-through portion 820, and a second pass-through portion 830. The connecting portion 810 is formed above the CMT layer 300 through intermediation of the third insulating layer 530 (not shown). The first pass-through portion 820 passes through the third insulating layer 530 to connect the connecting portion 810 and the common signal bus line 310 to each other. The second pass-through portion 830 passes through the third insulating layer 530, the CMT layer 300, the second insulating layer 500, the SDL layer 200, and the first insulating layer 400 to connect the connecting portion 810 and the GAL layer common potential bus line 130 to each other. As shown in FIG. 1, the second interlayer connecting portions 800 are provided as many as the common signal lines 310.

Figure 8:
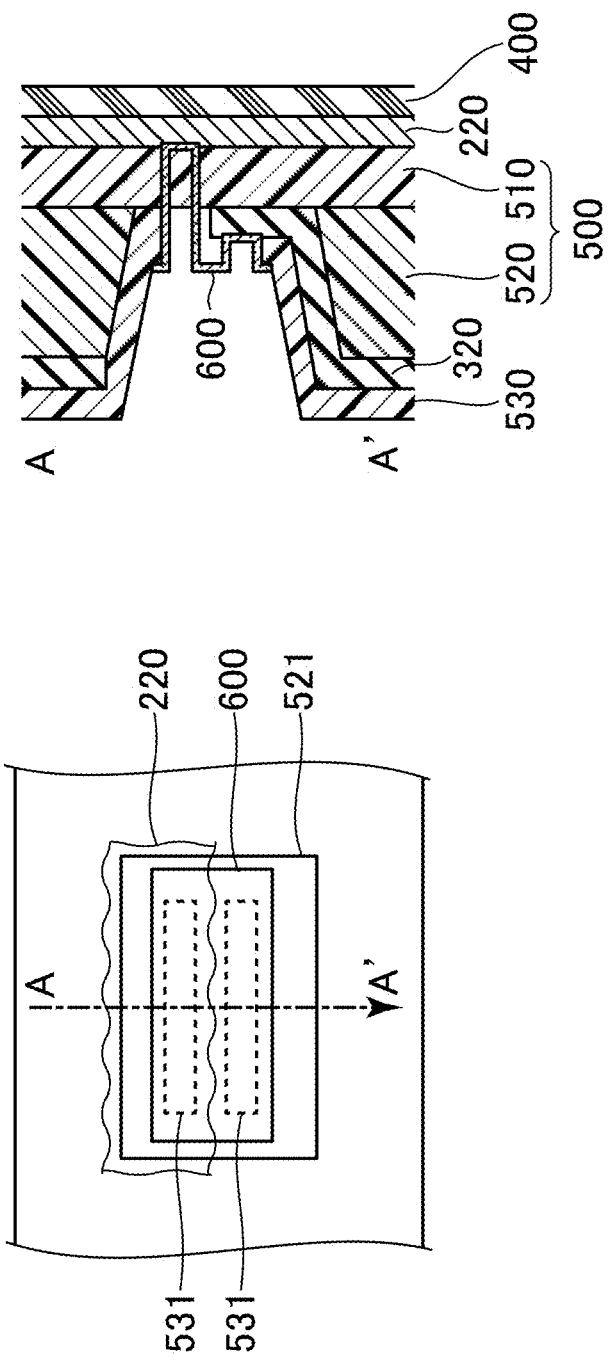
FIG. 8 illustrates an exemplary top view of a structure in the X part of the TFT substrate shown in FIG. 1 and an exemplary sectional view of a structure of a cross section taken along the line A-A' of the top view.

FIG. 8 illustrates an exemplary top view of a structure in the X part of the TFT substrate 10 shown in FIG. 1 and an exemplary sectional view of a structure of a cross section taken along the line A-A' of the top view. The SDL layer common potential bus line 220 is formed on the first insulating layer 400, and the second insulating layer 500 including an inorganic PAS layer 510 made of an inorganic material and an organic PAS layer 520 made of an organic material is formed on the SDL layer common potential bus line 220. Further, the common signal bus line 320 is formed on the second insulating layer 500, and the third insulating layer 530 made of an inorganic material is formed on the common signal bus line 320 and the like. The third insulating layer 530 has a third insulating layer opening portion 531 formed therein (in the third insulating layer 530), and the organic PAS layer 520 has a second insulating layer opening portion 521 formed therein (in the organic PAS layer 520). The interlayer connecting portion 600 is formed thereon so as to connect the SDL layer common potential bus line 220 and the common signal bus line 320 to each other.

Figure 9:
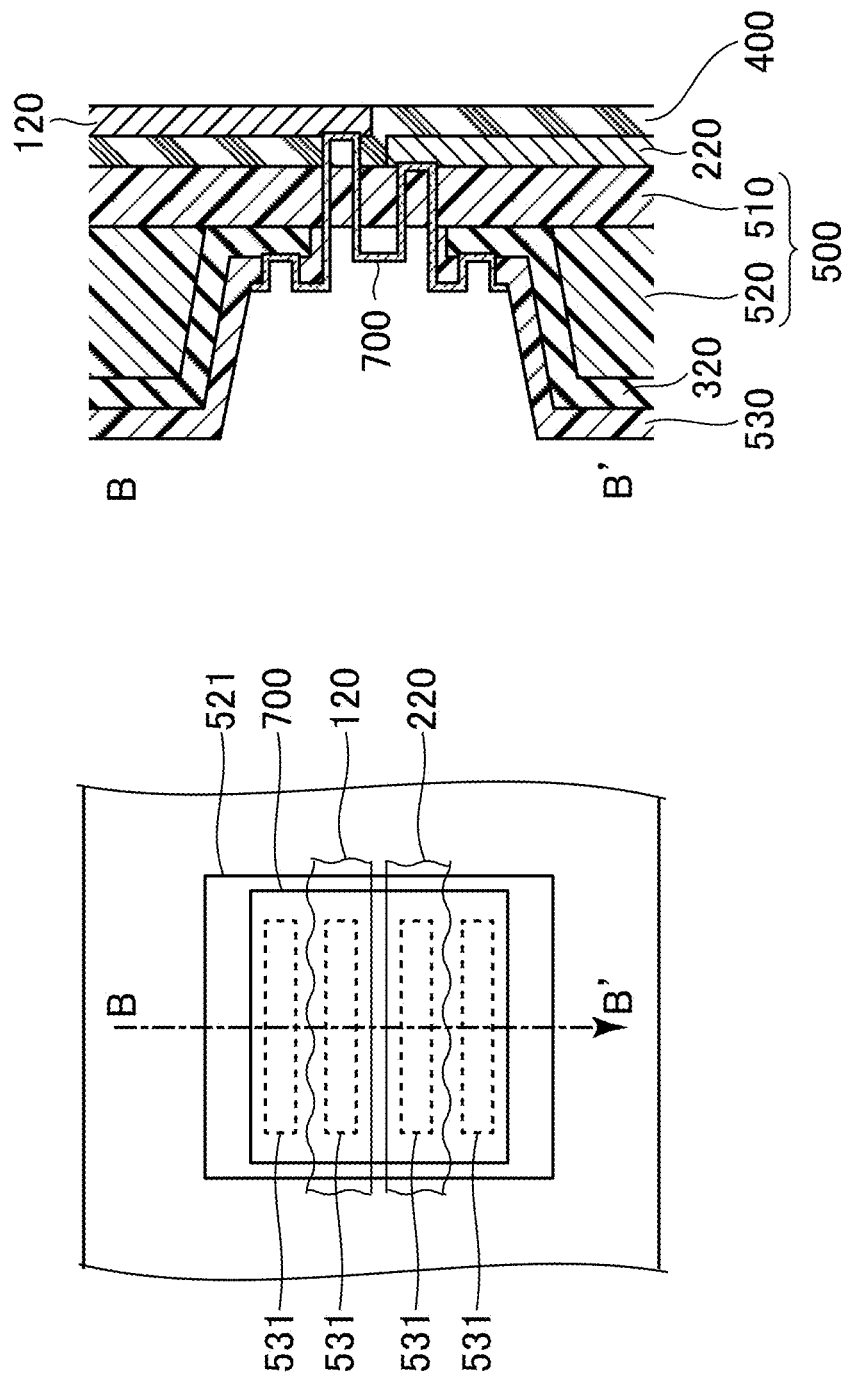
FIG. 9 illustrates an exemplary top view of a structure in a Z part of the TFT substrate shown in FIG. 1 and an exemplary sectional view of a structure of a cross section taken along the line B-B' of the top view.

FIG. 9 illustrates an exemplary top view of a structure in a Z part of the TFT substrate 10 shown in FIG. 1 and an exemplary sectional view of a structure of a cross section taken along the line B-B' of the top view. The SDL layer common potential bus line 220 is formed above the common signal input line 120 through intermediation of the first insulating layer 400, and the second insulating layer 500 including the inorganic PAS layer 510 made of an inorganic material and the organic PAS layer 520 made of an organic material is formed on the SDL layer common potential bus line 220 and the like. Further, the common signal bus line 320 is formed on the second insulating layer 500, and the third insulating layer 530 made of an inorganic material is formed on the common signal bus line 320 and the like. The third insulating layer 530 has the third insulating layer opening portion 531 formed therein (in the third insulating layer 530), and the organic PAS layer 520 has the second insulating layer opening portion 521 formed therein (in the organic PAS layer 520). A third interlayer connecting portion 700 is formed on the third insulating layer 530 and the like to connect the common signal input line 120 and the SDL layer common potential bus line 220 to each other.

Note that, in the respective figures described above, for the sake of easy understanding of the configuration, a configuration in which the common signal bus line 320 does not overlap with neither the GAL layer common potential bus line 130 nor the SDL layer common potential bus line 220 is illustrated, but with a configuration in which those bus lines overlap with each other at least in part, the display region 900 can be further increased.

In the above-mentioned configuration, the common signal is supplied from each of the common potential supply terminals 11 and 12. The common signal supplied from the common potential supply terminal 11 is transmitted through two bus lines, that is, the SDL layer common potential bus line 220 and the common signal bus line 320 provided on one side of the TFT substrate 10 on the gate signal supply terminal 13 side, and is input from the common signal bus line 320 to the common signal lines 310. As a result, for example, when the SDL layer common potential bus line 220 and the common signal bus line 320 each have the same resistance (dielectric constant), the resistance when the common signal is transmitted through the one side on the gate signal supply terminal 13 side is about half of the resistance in the conventional-art configuration.

On the other hand, the common signal input from the common potential supply terminal 12 is transmitted through the GAL layer common potential bus line 130 formed in the GAL layer 100, which is provided on another side opposed to the gate signal supply terminal 13, and is input to the common signal lines 310 via the second interlayer connecting portions 800. Therefore, the common signal is transmitted through a larger number of paths than that of the related-art configuration, and hence the resistance with respect to the common signal is further reduced.

(Second Embodiment)

Figure 10:
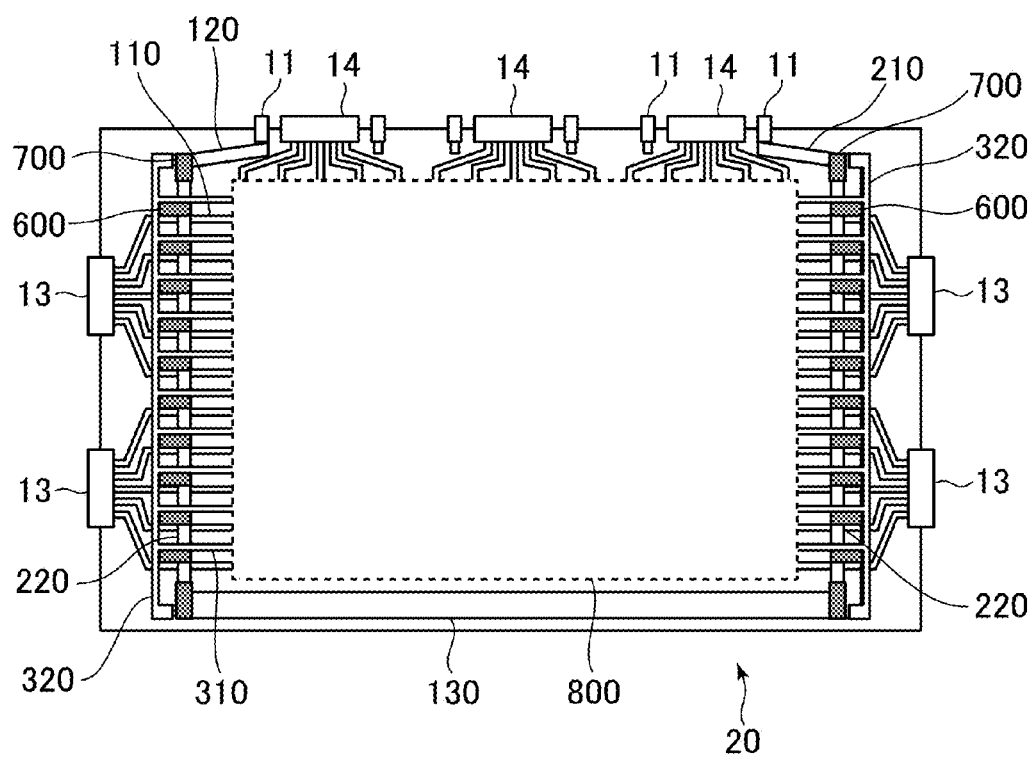
FIG. 10 illustrates another exemplary configuration of a TFT substrate of a liquid crystal display device.

FIG. 10 illustrates another exemplary configuration of a TFT substrate 20 of a liquid crystal display device of the present application. Only points different from the first configuration are described, and description of the same point is omitted. This embodiment differs from the first configuration in that the SDL layer common potential bus line 220 and the common signal bus line 320, which are connected to each other via the interlayer connecting portion 600, are formed on two opposing sides. According to this configuration, the number of transmission paths through which the common signal lines pass further increases, with the result that the influence of the transmission path resistance with respect to the common signal is further reduced.

Figure 11:
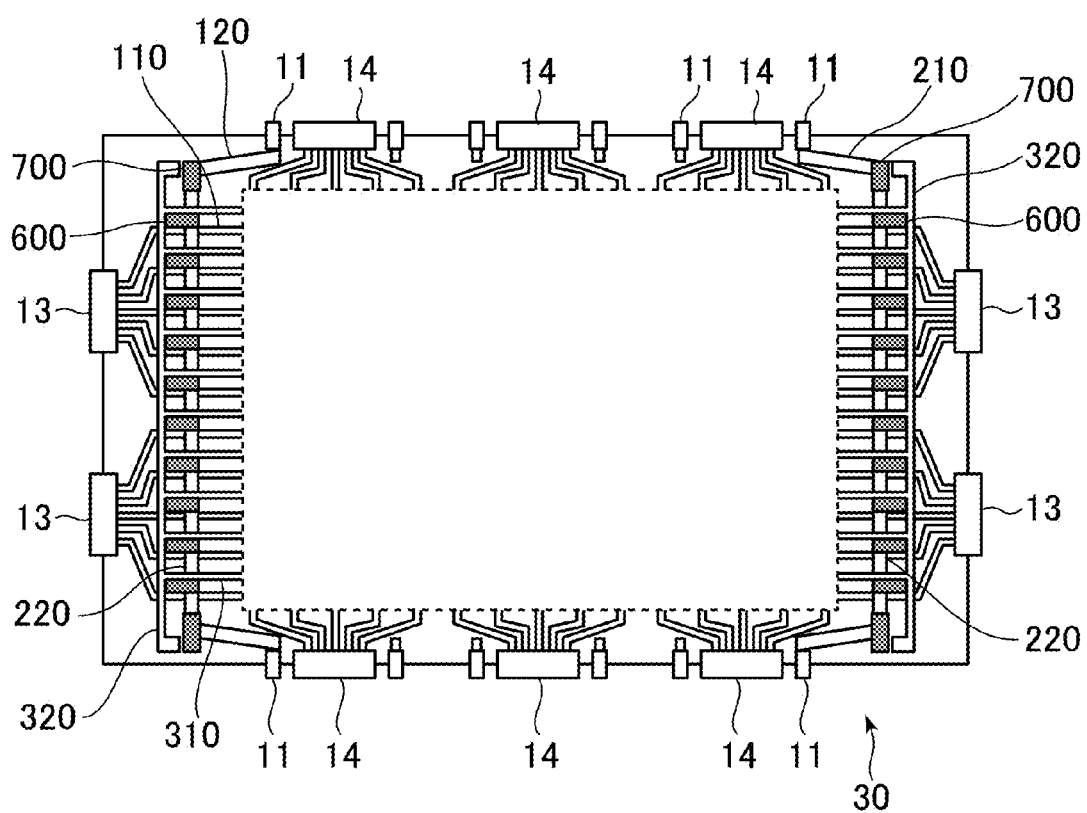
FIG. 11 illustrates another exemplary configuration of a TFT substrate of a liquid crystal display device.

Furthermore, FIG. 11 illustrates another exemplary configuration of a TFT substrate 30 of a liquid crystal display device of the present application. Only points different from the first configuration are described, and description of the same point is omitted. This configuration differs from the first configuration in that the common potential supply terminal 11 to which the common signal is input is formed on two opposing sides. According to this configuration, the number of supply sources of the common signal increases than that of the first configuration, with the result that a common signal having a smaller influence of transmission path resistance is supplied to the common electrode.

Figure 12:
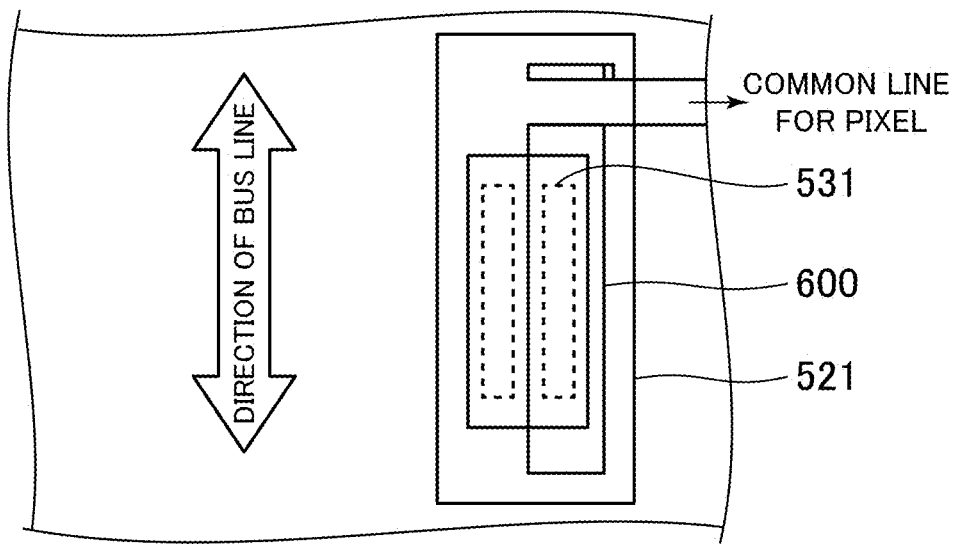
FIG. 12 illustrates an exemplary top view of another structure in the X part of the TFT substrate shown in FIG. 1.

FIG. 12 illustrates another exemplary structure in the X part of the TFT substrate 10 shown in FIG. 1. The SDL layer common potential bus line 220 is formed on the first insulating layer 400, and the second insulating layer 500 including the inorganic PAS layer 510 made of an inorganic material and the organic PAS layer 520 made of an organic material is formed on the SDL layer common potential bus line 220 and the like. Further, the common signal bus line 320 is formed on the second insulating layer 500, and the third insulating layer 530 made of an inorganic material is formed on the common signal bus line 320 and the like. The third insulating layer 530 has the third insulating layer opening portion 531 formed therein (in the third insulating layer 530), and the organic PAS layer 520 has the second insulating layer opening portion 521 formed therein (in the organic PAS layer 520). The interlayer connecting portion 600 is formed thereon so as to connect the SDL layer common potential bus line 220 and the common signal bus line 320 to each other.

Figure 13:
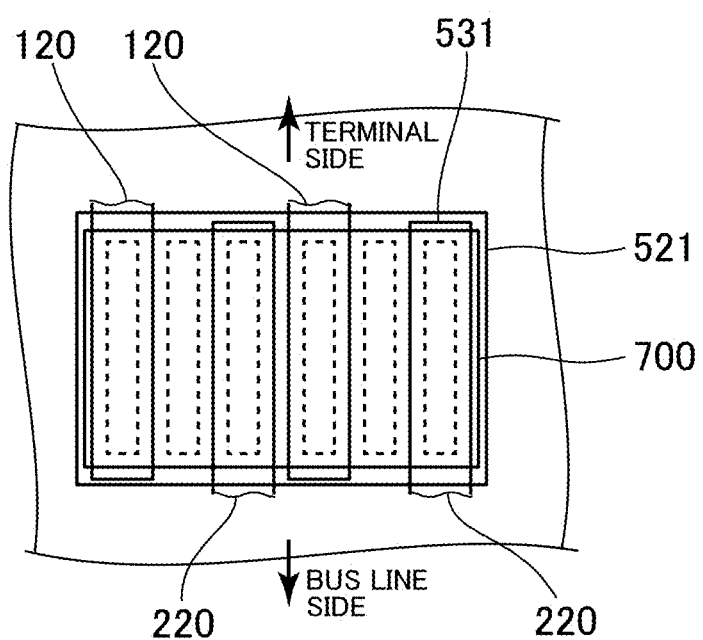
FIG. 13 illustrates an exemplary top view of another structure in the Z part of the TFT substrate shown in FIG. 1.

FIG. 13 illustrates another structure in the Z part of the TFT substrate 10 shown in FIG. 1. The SDL layer common potential bus line 220 is formed above the common signal input line 120 through intermediation of the first insulating layer 400, and the second insulating layer 500 including the inorganic PAS layer 510 made of an inorganic material and the organic PAS layer 520 made of an organic material is formed on the SDL layer common potential bus line 220 and the like. Further, the common signal bus line 320 is formed on the second insulating layer 500, and the third insulating layer 530 made of an inorganic material is formed on the common signal bus line 320 and the like. The third insulating layer 530 has the third insulating layer opening portion 531 formed therein (in the third insulating layer 530), and the organic PAS layer 520 has the second insulating layer opening portion 521 formed therein (in the organic PAS layer 520). The third interlayer connecting portion 700 is formed on the third insulating layer 530 and the like so as to connect the common signal input line 120 and the SDL layer common potential bus line 220 to each other.

(Other Modified Example)

The present application is described by way of configuration above, but it is needless to say that the present application may encompass various configurations that have been changed without departing from the gist of the present application.

For example, in the above-mentioned respective configuration, a layer (SDL layer 200) including the data signal lines 210 and the SDL layer common potential bus line 220 is formed above a layer (GAL layer 100) including the gate signal lines 110, the common signal input line 120, and the GAL layer common potential bus line 130, and a layer (CMT layer) including the common signal lines 310 and the common signal bus line 320 is further formed above the SDL layer 200. However, the present application is not limited to this configuration. For example, the upper and lower relationships among those layers may be reversed, or as long as the configuration includes the interlayer connecting portion 600 or the second interlayer connecting portion 800, members provided in the same layer in the above-mentioned configuration may be provided in different layers. Further, the configuration may include only one of the interlayer connecting portion 600 and the second interlayer connecting portion 800. Further, the common signal bus line 320 may be connected to a part of the ends of the common signal lines 310.

Further, in the above-mentioned respective configuration, the common signal bus line 320, the GAL layer common potential bus line 130, and the SDL layer common potential bus line 220 are formed in the short-side direction (along the short side) of the TFT substrate 10, but the present application is not limited thereto. For example, the common signal bus line 320 may be formed along the long-side direction of the TFT substrate 10, and in this case, the common potential supply terminals 11 and 12 may be arranged in the long-side direction of the TFT substrate 10.

While there have been described what are at present considered to be certain configuration of this application, it will be understood that various modifications may be made thereto, and it is intended that the append claims cover all such modifications as fall within the true spirit and scope of this application.

What is claimed is:

1. A liquid crystal display device, comprising a TFT substrate comprising:

a plurality of pixel electrodes having potentials controlled by a plurality of transistors; and a common electrode having a common potential supplied, wherein the TFT substrate comprises:

an A wiring layer;

a B wiring layer, which is formed above the A wiring layer through an intermediate layer of a first insulating layer; and a C wiring layer, which is formed above the B wiring layer through an intermediate layer of a second insulating layer, wherein a first wiring layer of the A, B, or C wiring layers comprises a plurality of gate signal lines for supplying a gate signal to the plurality of transistors, wherein a second wiring layer different from the first wiring layer comprising the plurality of gate signal lines, comprises:

a plurality of common signal lines for supplying the common potential to the common electrode; and a common signal bus line for connecting together ends of at least two of the plurality of common signal lines, the common signal bus line being made of a conductor, wherein a third wiring layer different from the first wiring layer comprising the plurality of gate signal lines and the second wiring layer comprising the plurality of common signal lines and the common signal bus line, comprises a plurality of data signal lines for supplying a plurality of data signals to the plurality of transistors, wherein at least one of the first wiring layer comprising the plurality of gate signal lines and the third wiring layer comprising the plurality of data signal lines, comprises a common potential bus line for supplying the common potential to the plurality of common signal lines, and wherein the A wiring layer comprises the plurality of gate signal lines, wherein the B wiring layer comprises the plurality of data signal lines and the common potential bus line, and wherein the C wiring layer comprises the plurality of common signal lines and the common signal bus line, wherein the TFT substrate further comprises an interlayer connecting portion for connecting the common signal bus line and the common potential bus line to each other, the interlayer connecting portion being made of a conductor, and wherein the interlayer connecting portion comprises:

a connecting portion having a planer shape, which is formed above the C wiring layer through an intermediate layer of a third insulating layer;

a first pass-through portion that passes through the third insulating layer to connect the connecting portion and the common signal bus line to each other; and a second pass-through portion that passes through the third insulating layer, the C wiring layer, and the second insulating layer to connect the connecting portion and the common potential bus line to each other.

2. The liquid crystal display device according to claim 1, wherein the at least two of the plurality of common signal lines are formed so as to protrude and extend from the common signal bus line.

3. The liquid crystal display device according to claim 1, wherein the TFT substrate has a surface including a display region in which the plurality of pixel electrodes are formed and a non-display region that surrounds the display region, and wherein the common signal bus line and the common potential bus line are formed in a region corresponding to the non-display region.

4. The liquid crystal display device according to claim 1, wherein the common signal bus line and the common potential bus line at least partially overlap with each other.

5. The liquid crystal display device according to claim 1, wherein the common signal bus line connects together the ends of all of the plurality of common signal lines.

6. The liquid crystal display device according to claim 1, wherein the first pass-through portion of each of a plurality of the interlayer connecting portions is connected to a part of the common signal bus line, which is adjacent to one of the ends of the plurality of common signal lines.

7. The liquid crystal display device according to claim 1, wherein the common potential bus line and the common signal bus line are connected to a common potential supply terminal of the TFT substrate, from which the common potential is supplied.

8. The liquid crystal display device according to claim 7, wherein the common potential supply terminal is arranged in a long-side direction of the TFT substrate.

9. The liquid crystal display device according to claim 1, wherein the interlayer connecting portion is made of a transparent electrode material.

10. The liquid crystal display device according to claim 1, wherein the interlayer connecting portion is provided for each of the ends of the plurality of common signal lines.

11. The liquid crystal display device according to claim 1, wherein the C wiring layer comprises a layer made of an organic material.

12. The liquid crystal display device according to claim 1, wherein the common signal bus line and the common potential bus line are formed in a short-side direction of the TFT substrate.

13. The liquid crystal display device according to claim 1, wherein the common signal bus line is formed in a long-side direction of the TFT substrate.

14. A liquid crystal display device, comprising a TFT substrate comprising:

a plurality of pixel electrodes having potentials controlled by a plurality of transistors; and a common electrode having a common potential supplied, wherein the TFT substrate comprises:

an A wiring layer;

a B wiring layer, which is formed above the A wiring layer through an intermediate layer of a first insulating layer; and a C wiring layer, which is formed above the B wiring layer through an intermediate layer of a second insulating layer, wherein a first wiring layer of the A, B, or C wiring layers comprises a plurality of gate signal lines for supplying a gate signal to the plurality of transistors, wherein a second wiring layer different from the first wiring layer comprising the plurality of gate signal lines, comprises:

a plurality of common signal lines for supplying the common potential to the common electrode; and a common signal bus line for connecting together ends of at least two of the plurality of common signal lines, the common signal bus line being made of a conductor, wherein a third wiring layer different from the first wiring layer comprising the plurality of gate signal lines and the second wiring layer comprising the plurality of common signal lines and the common signal bus line, comprises a plurality of data signal lines for supplying a plurality of data signals to the plurality of transistors, wherein at least one of the first wiring layer comprising the plurality of gate signal lines and the third wiring layer comprising the plurality of data signal lines, comprises a common potential bus line for supplying the common potential to the plurality of common signal lines, and wherein the A wiring layer comprises the plurality of gate signal lines and the common potential bus line, wherein the B wiring layer comprises the plurality of data signal lines, and wherein the C wiring layer comprises the plurality of common signal lines and the common signal bus line, wherein the TFT substrate further comprises an interlayer connecting portion for connecting the common signal bus line and the common potential bus line to each other, the interlayer connecting portion being made of a conductor, and wherein the interlayer connecting portion comprises:
a connecting portion having a planer shape, which is formed above the C wiring layer through an intermediate layer of a third insulating layer;
a first pass-through portion that passes through the third insulating layer to connect the connecting portion and the common signal bus line to each other; and
a second pass-through portion that passes through the third insulating layer, the C wiring layer, the second insulating layer, the B wiring layer, and the first insulating layer to connect the connecting portion and the common potential bus line to each other.

15. A liquid crystal display device, comprising a TFT substrate comprising:
a plurality of pixel electrodes having potentials controlled by a plurality of transistors; and
a common electrode having a common potential supplied,
wherein the TFT substrate comprises:
an A wiring layer;
a B wiring layer, which is formed above the A wiring layer through an intermediate layer of a first insulating layer; and
a C wiring layer, which is formed above the B wiring layer through an intermediate layer of a second insulating layer,
wherein a first wiring layer of the A, B, or C wiring layers comprises a plurality of gate signal lines for supplying a gate signal to the plurality of transistors,
wherein a second wiring layer different from the first wiring layer comprising the plurality of gate signal lines, comprises:
a plurality of common signal lines for supplying the common potential to the common electrode; and
a common signal bus line for connecting together ends of at least two of the plurality of common signal lines, the common signal bus line being made of a conductor,
wherein a third wiring layer different from the first wiring layer comprising the plurality of gate signal lines and the second wiring layer comprising the plurality of common signal lines and the common signal bus line, comprises a plurality of data signal lines for supplying a plurality of data signals to the plurality of transistors, wherein at least one of the first wiring layer comprising the plurality of gate signal lines and the third wiring layer comprising the plurality of data signal lines, comprises a common potential bus line for supplying the common potential to the plurality of common signal lines, and wherein the A wiring layer comprises the plurality of gate signal lines, wherein the B wiring layer comprises the plurality of data signal lines, wherein the C wiring layer comprises the plurality of common signal lines and the common signal bus line, wherein the common potential bus line comprises an A wiring layer common potential bus line formed in the A wiring layer and a B wiring layer common potential bus line formed in the B wiring layer, wherein the TFT substrate further comprises an interlayer connecting portion for connecting the common signal bus line and the common potential bus line to each other, the interlayer connecting portion being made of a conductor, and wherein the interlayer connecting portion comprises:
a first interlayer connecting portion comprising:
a first connecting portion having a planar shape, which is formed above the C wiring layer through an intermediate layer of a third insulating layer;
a first pass-through portion that passes through the third insulating layer to connect the first connecting portion and the common signal bus line to each other; and
a second pass-through portion that passes through the third insulating layer, the C wiring layer, and the second insulating layer to connect the first connecting portion and the B wiring layer common potential bus line to each other; and
a second interlayer connecting portion comprising:
a second connecting portion having a planar shape, which is formed above the C wiring layer through an intermediate layer of the third insulating layer;
a third pass-through portion that passes through the third insulating layer to connect the second connecting portion and the common signal bus line to each other; and
a fourth pass-through portion that passes through the third insulating layer, the C wiring layer, the second insulating layer, the B wiring layer, and the first insulating layer to connect the second connecting portion and the A wiring layer common potential bus line to each other.

* * * * *